US012152766B2

(12) United States Patent
Brandstätter et al.

(10) Patent No.: US 12,152,766 B2
(45) Date of Patent: Nov. 26, 2024

(54) CONNECTION DEVICE FOR LIGHTING UNIT DRIVERS

(71) Applicant: ZUMTOBEL LIGHTING GMBH, Dornbirn (AT)

(72) Inventors: Klaus Brandstätter, Hard (AT); Ka Yue Anthony Wong, Hong Kong (CN); Simone Wagenseil, Leutkirch (DE)

(73) Assignee: Zumtobel Lighting GmbH, Dornbirn (AT)

( * ) Notice: Subject to any disclaimer, the term of this patent is extended or adjusted under 35 U.S.C. 154(b) by 407 days.

(21) Appl. No.: 17/639,468

(22) PCT Filed: Aug. 6, 2020

(86) PCT No.: PCT/EP2020/072081
§ 371 (c)(1),
(2) Date: Mar. 1, 2022

(87) PCT Pub. No.: WO2021/043525
PCT Pub. Date: Mar. 11, 2021

(65) Prior Publication Data

US 2022/0268431 A1 Aug. 25, 2022

(30) Foreign Application Priority Data

Sep. 2, 2019 (DE) ..................... 20 2019 104 805.0

(51) Int. Cl.
*H01R 24/20* (2011.01)
*F21V 23/06* (2006.01)
(Continued)

(52) U.S. Cl.
CPC ......... *F21V 23/06* (2013.01); *H01R 13/5213* (2013.01); *H01R 13/582* (2013.01);
(Continued)

(58) Field of Classification Search
None
See application file for complete search history.

(56) References Cited

U.S. PATENT DOCUMENTS 5,295,857 A * 3/1994 Toly ..................... H01R 4/2433 439/417
6,273,587 B1 8/2001 Demshki
(Continued)

FOREIGN PATENT DOCUMENTS

CA 2678609 A1 3/2011
CN 207052898 U 2/2018
(Continued)

OTHER PUBLICATIONS

PCT/EP2020/072081 International Search Report and Written Opinion dated Sep. 30, 2020, 12 pages.
(Continued)

*Primary Examiner* — Tho D Ta
(74) *Attorney, Agent, or Firm* — Andrus Intellectual Property Law, LLP

(57) ABSTRACT

The invention relates to a device for connecting a lighting unit driver (3) to a voltage supply, having a plug (1) comprising: an electric connection terminal (12) for a current supply cable; a housing (11) for receiving the electric connection terminal (12); a plug element (14) on one side of the housing (11) for producing a plug connection, wherein the plug element (14) is electrically connected to the electric connection terminal (12); and a corresponding plug element (2) which is formed directly on a housing (4) of the lighting unit driver (3) and corresponds to the plug element (14) in order to allow a form-fitting and electrically conductive plug connection between the plug element (14) of the plug (1) and the corresponding plug element (2).

17 Claims, 3 Drawing Sheets

(51) Int. Cl.

| | |
|---|---|
| ***H01R 13/52*** | (2006.01) |
| ***H01R 13/58*** | (2006.01) |
| ***H01R 13/627*** | (2006.01) |
| ***H01R 13/642*** | (2006.01) |
| *H01R 107/00* | (2006.01) |

(52) U.S. Cl.

CPC ....... *H01R 13/6272* (2013.01); *H01R 13/642* (2013.01); *H01R 24/20* (2013.01); *H01R 2107/00* (2013.01)

(56) References Cited

U.S. PATENT DOCUMENTS

| | | | | |
|---|---|---|---|---|
| 7,329,131 | B1 | 2/2008 | Chen | |
| 7,540,749 | B1 * | 6/2009 | Hall | H01R 13/516 439/135 |
| 9,509,110 | B1 * | 11/2016 | Buck | F21V 23/06 |
| 9,647,349 | B1 * | 5/2017 | Stillman | H01R 4/2433 |
| 2005/0000786 | A1 | 1/2005 | Huang | |
| 2015/0241035 | A1 * | 8/2015 | Dankelmann | F21V 21/005 439/725 |
| 2017/0170576 | A1 | 6/2017 | Corona | |
| 2019/0148889 | A1 * | 5/2019 | Little | H01R 13/6587 439/607.05 |

FOREIGN PATENT DOCUMENTS

| | | | |
|---|---|---|---|
| DE | 11 2009 000697 | T5 | 2/2011 |
| DE | 10 2019 126933 | A1 | 4/2021 |
| DE | 10 2019 126955 | A1 | 4/2021 |
| EP | 0762546 | A2 * | 3/1997 |
| EP | 2091111 | A1 | 8/2009 |

OTHER PUBLICATIONS

EP21170057.0, European Search Report dated Oct. 7, 2021, 3 pages.

* cited by examiner

CONNECTION DEVICE FOR LIGHTING UNIT DRIVERS

CROSS-REFERENCE TO RELATED APPLICATION

The present application is the U.S. national stage application of international application PCT/EP2020/072081 filed Aug. 6, 2020, which international applications was published on Mar. 11, 2021 as International Publication WO 2021/043525 A1. The international application claims priority to German Patent Application 20 2019 104 805.0 filed Sep. 2, 2019.

FIELD OF THE INVENTION

The present invention relates to a device for the convenient connection of a driver for lighting units to a connection cable of the voltage supply.

BACKGROUND OF THE INVENTION

The connection of a driver for lighting units to a voltage supply usually takes place in that a connection terminal or connecting terminal is arranged on the housing of the driver, to which connection terminal or connecting terminal the cable of the voltage supply is to be connected. Such connection terminals are more or less easy to handle, but in principle such tasks should be performed by an electrician, whereby an increased installation expense results.

Although solutions have been known in the meantime in which the cable of the voltage supply can already be connected beforehand to a separate connection component, a cable connection to the driver must still be established at a later point in time even in this event. Although this does not necessarily need to be performed by an electrician, the expense for connecting the driver to the voltage supply is substantially maintained.

SUMMARY OF THE INVENTION

The invention is therefore based on the object of providing a possibility of enabling a convenient and reliable connection of driver-side and supply cable-side connection components that can be performed by untrained personnel and at a later time in an installation phase for luminaires.

The object is achieved according to the invention by a device having the features of independent claim 1. Advantageous developments are the subject-matter of the respectively related dependent claims.

A device according to the invention for connecting a lighting unit driver to a voltage supply includes a plug comprising an electric connection terminal, a housing for receiving the electric connection terminal, and a plug element, as well as a corresponding plug element which is formed directly on a housing of the lighting unit driver and is electrically coupled thereto. The lighting unit driver is, for example, an electrical converter for supplying current to a lighting unit. The lighting unit is preferably a light-emitting diode (LED) or LED modules, for example in the form of a light tile or a light panel. The plug element on one side of the device housing is preferably a row of plugs which correspond to plug sockets on the corresponding plug element on the lighting unit driver in order to enable an electrically conductive, form-fitting and thus mechanically stable plug connection of the plug element to the corresponding plug element.

Preferably, the device includes a mechanical strain relief clamp which also mechanically fixes the current supply cable to the device. For this purpose, the housing of the plug is suitable for receiving the mechanical strain relief clamp. In this way, a reliable electrical contact is ensured even if tensile forces act in the current supply cable.

Preferably, the housing of the plug for receiving the electric connection terminal includes a hinged cover in order to enable convenient access to the electric connection terminal and, at the same time, to protect the connection terminal and the current supply cable connected thereto against damage and contamination.

The hinged housing cover is preferably transparent in order to enable visual inspection of the contact of the current supply cable with the electric connection terminal. As a result, before the final connection of the lighting unit driver, it is possible, for example, to visually check again whether the current supply cable has actually been connected in the correct manner to the connection terminal of the device according to the invention.

Preferably, the housing has fastening elements in order to fasten the device to a surface, especially to a wall. Especially given built-in luminaires whose drivers have to be arranged in the interstitial ceiling space, it is advantageous if the device according to the invention is fastened to a surface of the interstitial ceiling space in order to enable simple plugging in of the lighting unit driver.

Preferably, the plug element of the device according to the invention is shaped in such a way as to prevent a rotated connection of the plug element to the corresponding plug element on the lighting unit driver.

For this purpose, it is advantageous to provide the plug element with recesses and/or projections which only allow the plug element to be joined together with the corresponding plug element of the lighting unit driver if the corresponding plug element has, at the respective connection point, the corresponding counterpart to the recess or to the projection of the plug element. A rotated connection of the plug element to the corresponding plug element on the lighting unit driver is thereby precluded.

The connection terminal of the device according to the invention preferably has an additional contact in order to enable a feed-through wiring or an additional voltage supply. In an exemplary embodiment, the additional contact of the connection terminal can serve for the additional power supply of luminaires specifically used as emergency lighting luminaires, whereas it serves for the feed-through wiring of the permanent phase typically present in emergency lighting systems with a single battery in the event that the connected luminaire is not an emergency luminaire.

The plug element of the device according to the invention preferably has a fixing element in order to enable mechanical latching between the plug element and the corresponding plug element at the lighting unit driver.

For example, the fixing element can consist of a tongue which has a wedge at the end, which wedge engages in a groove of the corresponding plug element and latches if a sufficient insertion depth, and thus reliable connection of the two corresponding plug elements, is achieved.

The plug element preferably has contact pins which are designed to enable a form-fitting connection to contact sockets of the corresponding plug element on the lighting unit driver. This facilitates the assembly of luminaires since the driver-side and supply cable-side components can be easily and reliably coupled and, as a result, a connection can be established without further measures, especially without further tools or the like.

In a further embodiment, the contact pins and the plug openings can be exchanged in pairs so that the plug element has partly or only plug openings and the corresponding plug element on the lighting unit driver has the corresponding counter-configuration.

Since the corresponding plug element is now an integral part of the driver housing, the final connection of the driver to the power supply can thus be performed in a convenient manner, especially without tools or further connecting elements between the driver housing and the corresponding plug element.

Preferably, the corresponding plug element is adapted to the driver housing in a form-fitting manner. In this way, the combination of plug element (supply cable-side component), corresponding plug element (driver-side component), and driver housing has no faces or projections which would impede the accommodation of the plug system in, for example, difficult-to-access interstitial ceiling spaces.

BRIEF DESCRIPTION OF THE DRAWINGS

The invention is described in the following using the accompanying drawings. Shown herein are.

DETAILED DESCRIPTION

Figure 1:
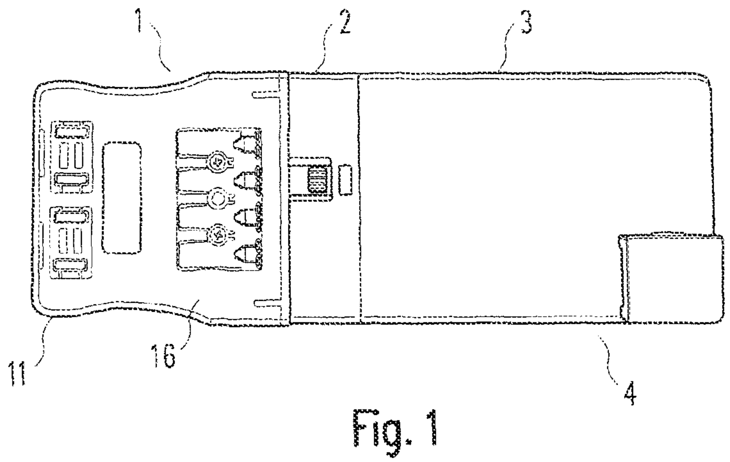
FIG. 1 an exemplary embodiment of the connection device according to the invention, in an overview presentation.
Figure 2:
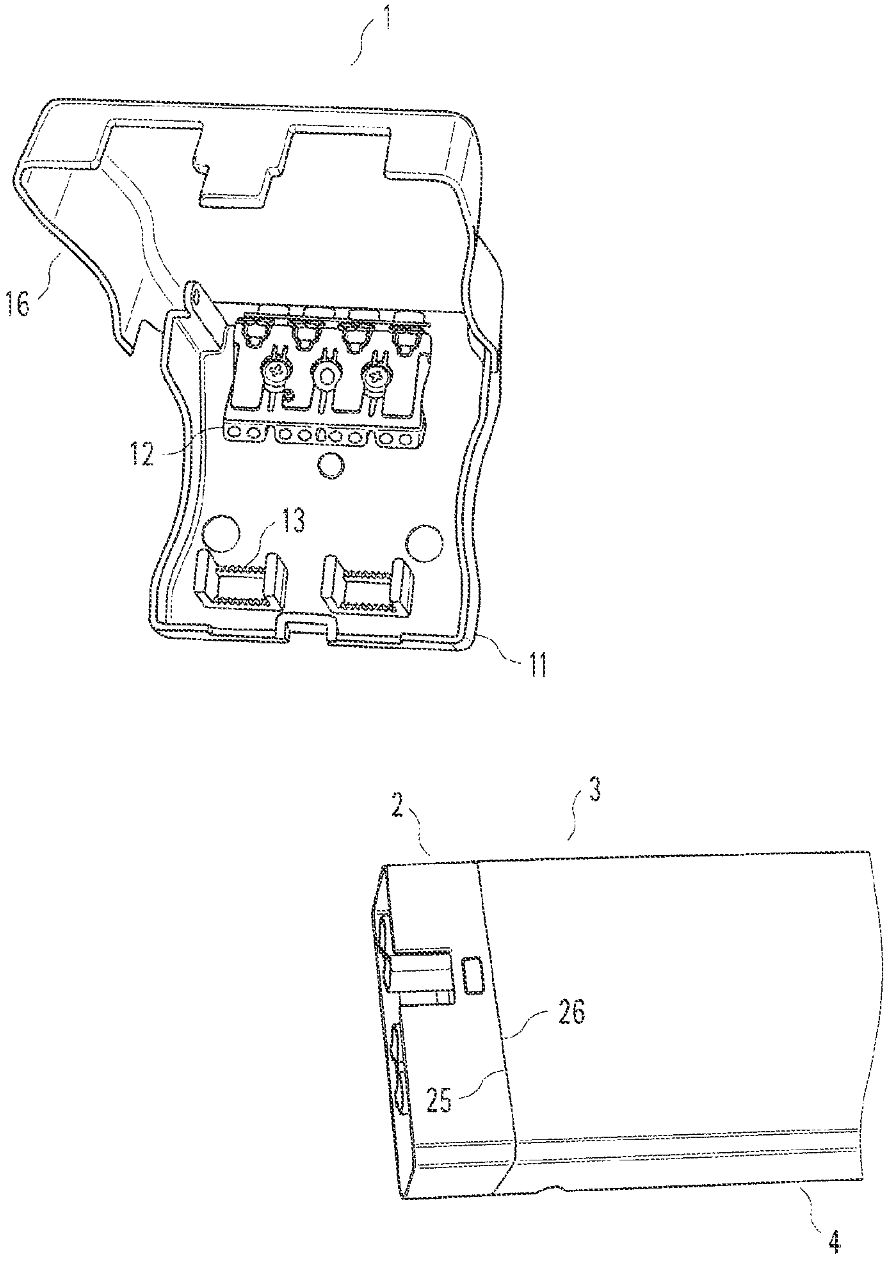
FIG. 2 the connection device in a detail view, with an open housing cover.

First, the basic design and the functioning of the connection device according to the invention is illustrated using FIGS. 1 and 2. Finally, the plug structure of an exemplary embodiment of the plug is discussed further using FIG. 3. Identical elements are, in part, not repeatedly illustrated and described in similar illustrations.

FIG. 1 shows the connection device consisting of a plug 1 with plugged-in driver-side components 2 and 3, in a view from above. The plug 1 represents the supply cable-side connection component and has a housing 11 on which a cover 16 is provided. The cover 16 preferably has a hinged design in order to ensure convenient access to the connection terminal and strain relief clamp, and is shown in the closed state in FIG. 1. Furthermore, the cover 16 is preferably designed to be transparent, in order to enable the connection of the current supply cable and the connection terminal to be visually inspected before the final connection of a luminaire or the lighting unit driver.

Shown in FIG. 2 is the plug connection according to the invention in a separate configuration, wherein the lighting unit driver 3 is shown with a clearly visibly corresponding plug element 2 unplugged next to the plug 1. The folded-open cover 16 of the plug housing 11, which includes a connection terminal 12 for connecting a current supply cable (not shown), can be seen here. Furthermore, strain relief devices 13 provided in the housing 11 are shown which also mechanically fix the current supply cable to the plug 1.

An advantageous embodiment of the connection terminal 12 may consist in that the connection terminal 12 has an additional contact exceeding the number of conductors of a conventional current supply cable, which additional contact is used for supplying current to luminaires specifically used as emergency lighting luminaires. In a larger system, it is typical that not all luminaires are used as emergency luminaires, but rather only a certain portion thereof, for example every fifth luminaire. In this event, it is now provided that the additional contact of the connection terminal 12 is used to realize the feed-through wiring for the power supply of the emergency luminaires. Only for the luminaires that are actually used as emergency luminaires is this corresponding contact then also accordingly electrically coupled to the lighting unit driver 3 upon being connected thereto. By contrast, for all other luminaires, the additional contact at the connection terminal 12 serves exclusively to enable the feed-through wiring.

According to the invention, the corresponding plug element 2 is, on its rear side 25, arranged directly on the driver housing 4 which comprises the lighting unit driver 3. In contrast to previously known achievements, the plug element 2 is therefore now an integral component of the driver housing 4 or of the driver 3 and is coupled internally to the electronic components of the driver 3, without further measures being required here to establish an electrical connection.

Figure 3:
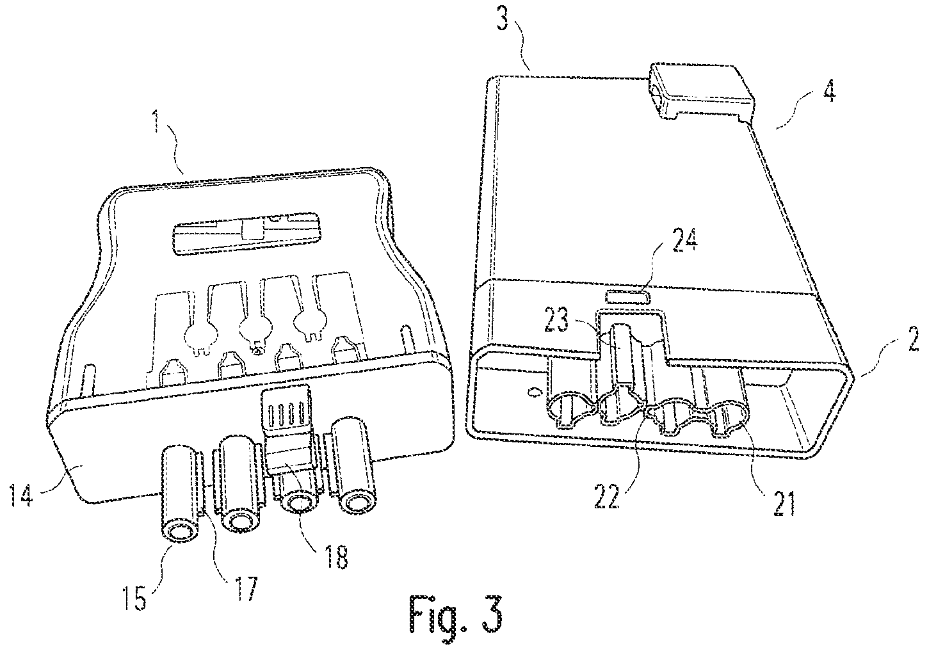
FIG. 3 the connection device in a further detail view, with closed housing cover and visible plug bars.

FIG. 3 shows a further view of the plug connection according to the invention, with special focus on the plug bar 14 of the plug 1 and the corresponding socket 2 on the lighting unit driver 3. Especially, the direct arrangement of the corresponding plug 2 on the lighting unit driver 3 contributes significantly on the one hand to the reduction of the number of required components and, on the other hand, to the reduction of the effort when connecting the lighting unit driver 3 to the power supply.

The plug element 14 of the plug 1 preferably comprises a row of plug pins or contact pins 15 in order to enable a form-fitting and electrically conductive connection to corresponding plug openings or contact openings 21 on the plug element 2 of the lighting unit driver 3, without being dependent on the use of tool or professional experience. In an alternative embodiment and as required, plug pins and corresponding plug openings can be exchanged with one another so that the plug element 14 has partly or only plug openings and the plug element 2 on the lighting unit driver 3 has the corresponding counter-configuration.

Preferably, the plug element 14 also has a fixing element 18 in order to enable mechanical latching between the plug element 2 on the lighting unit driver 3 and the supply cable-side plug element 14. In one embodiment, the fixing element 18 has a tongue which, at the end, is formed into a wedge in order to engage in a groove 24 of the corresponding plug element 2.

The plug element 14 can also have structures and/or recesses or projections 17 which prevent a rotated connection of the plug element 14 to the corresponding plug element 2 on the lighting unit driver. The plug pins 15 of the plug element 14 preferably have projections 17 which engage in corresponding recesses 22 of the plug element 2 of the lighting unit driver in a form-fitting manner. Here too, in an alternative embodiment and as required, projections and recesses can be exchanged with one another so that the plug element 14 has partly or only recesses on the plug pins 15 and the plug element 2 on the lighting unit driver 3 has the corresponding counter-configuration. The plug element 14 can also have plug pins which are not all attached in a row but rather are partially offset on the surface of the plug element 14 in order to likewise prevent a rotated connection of the plug element 14 to the corresponding plug element 2 on the lighting unit driver.

The invention is thereby not limited to the illustrated exemplary embodiments. Especially, the lighting unit driver can be a wide variety of types of lighting unit drivers or electrical converters. The plug element of the plug according to the invention can also be attached to different sides of the housing. Different orientations of the axis of rotation about which the hinged cover rotates are also conceivable. Likewise, the shown shapes of the connection terminal or strain relief clamp are not limited by the invention as long as they correspond to their purpose. Likewise, the structures and/or recesses on the plug element and on the corresponding plug element of the device/plug according to the invention are not limited by the embodiments described above. Especially, all the described structures and/or recesses on the plug element and the side of the corresponding plug element facing toward it are also conceivable for the rear-side connection of the corresponding plug element to an end face of the lighting unit driver or its housing. All features described above or features shown in figures can advantageously be combined with one another as desired within the scope of the invention.

What is claimed is:

1. A system for connecting an LED driver (3) to a voltage supply, the system comprising:

an LED driver having a driver housing (4) and an electrical converter that supplies current suitable for an LED lighting module;

a plug (1) comprising an electric connection terminal (12) for a current supply cable;

a plug housing (11) for receiving the electric connection terminal (12);

a plug element (14) on one side of the plug housing (11) for establishing a plug connection, wherein the plug element (14) is electrically connected to the electric connection terminal (12); and a corresponding plug element (2), which is an integral component of the driver housing (4) and coupled internally with the electronic components of the LED driver (3), and which corresponds to the plug element (14) in order to enable a form-fitting and electrically conductive plug connection between the plug element (14) of the plug (1) and the corresponding plug element (2) on the LED driver housing.

2. The device according to claim 1, wherein the plug (1) furthermore has a mechanical strain relief clamp (13) for the current supply cable, and the housing (11) of the plug (1) is furthermore designed to receive the mechanical strain relief clamp (13).

3. The device according to claim 1, wherein the housing (11) of the plug (1) has a hinged cover (16) in order to enable access to the electric connection terminal (12).

4. The device according to claim 3, wherein the hinged cover (16) is transparent in order to enable visual inspection of the contact of the current supply cable with the electric connection terminal (12).

5. The device according to claim 1, wherein the housing (11) has fastening elements (13) in order to fasten the device to a surface, especially to a wall.

6. The device according to claim 1, wherein the plug element (14) has contact pins (15) that are designed to enable a form-fitting connection to contact sockets (21) of the corresponding plug element (2) on the lighting unit driver (3).

7. The device according to claim 1, wherein the plug element (14) has contact sockets that are designed to enable a form-fitting connection to contact pins of the corresponding plug element (2) on the lighting unit driver (3).

8. The device according to claim 1, wherein the corresponding plug element (2) is adapted in a form-fitting manner to the driver housing (4).

9. The device according to claim 1, wherein the plug element (14) is shaped in such a way as to prevent a rotated connection of the plug element to the corresponding plug element (2) on the lighting unit driver (3).

10. The device according to claim 9, wherein the plug element (14) has structures and/or recesses or projections (17) which prevent a rotated connection of the plug element (14) to the corresponding plug element (2) on the lighting unit driver.

11. The device according to claim 10, wherein the corresponding plug element (2) on the lighting unit driver (3) has complementary structures and/or recesses (22) or projections (23) in order to prevent a rotated connection of the corresponding plug element (2) to the plug element (14).

12. The device according to claim 1, wherein the plug element (14) has a fixing element (18) in order to enable a mechanical latching between the plug element (14) and the corresponding plug element (2) on the lighting unit driver (3).

13. The device according to claim 12, wherein the fixing element (18) has a tongue which, at the end, is formed into a wedge in order to engage in a groove (24) of the corresponding plug element (2).

14. A lighting system comprising multiple LED luminaires, at least one emergency luminaire, a first voltage supply and another voltage supply comprising a battery, the system further comprising:

an LED driver (3) having an electrical converter that receives power from the first voltage supply through a current supply cable and supplies power suitable for use by said LED luminaires a plug (1) comprising an electric connection terminal (12) for the current supply cable;

a plug housing (11) in which the electric connection terminal (12) is located;

a plug element (14) on one side of the housing (11) for establishing a plug connection, wherein the plug element (14) is electrically connected to the electric connection terminal (12); and a corresponding plug element (2), which is formed directly on a housing (4) of the LED driver (3) and corresponds to the plug element (14) in order to enable a form-fitting and electrically conductive plug connection between the plug element (14) of the plug (1) and the corresponding plug element (2) on the LED driver (3); and wherein the electric connection terminal (12) has an additional contact for feed-through wiring to provide power from the battery to the at least one emergency luminaire.

15. A device for connecting an LED driver (3) to a voltage supply, having a plug (1) comprising an electric connection terminal (12) for a current supply cable;

a plug housing (11) in which the electric connection terminal (12) is located, wherein the plug housing (11)

has a hinged cover (16) in order to enable access to the electric connection terminal (12);

a plug element (14) on one side of the plug housing (11) for establishing a plug connection, wherein the plug element (14) is electrically connected to the electric connection terminal (12); and a corresponding plug element (2), which is formed directly on a housing (4) of the LED driver (3) and corresponds to the plug element (14) on the plug (1) in order to enable a form-fitting and electrically conductive plug connection between the plug element (14) of the plug (1) and the corresponding plug element (2) of the LED driver (3), wherein the LED driver (3) comprises an electrical converter that converts power supplied to the LED driver into power suitable for one or more LED modules.

16. The device according to claim 15, wherein the plug element (14) on the plug (1) is shaped in such a way as to prevent a rotated connection of the plug element (14) to the corresponding plug element (2) on the LED driver (3).

17. The device according to claim 15, wherein the hinged cover (16) is transparent.

* * * * *